United States Patent [19]

Kataoka

[11] Patent Number: 5,324,120
[45] Date of Patent: Jun. 28, 1994

[54] WORD PROCESSING APPARATUS

[75] Inventor: Misao Kataoka, Mie, Japan

[73] Assignee: Brother Kogyo Kabushiki Kaisha, Nagoya, Japan

[21] Appl. No.: 977,881

[22] Filed: Nov. 17, 1992

[30] Foreign Application Priority Data

Nov. 27, 1991 [JP] Japan ................................. 3-312241

[51] Int. Cl.5 .............................................. G06F 3/00
[52] U.S. Cl. ..................................... 400/63; 395/145; 364/962
[58] Field of Search ............................. 400/61, 63, 76; 395/145, 146

[56] References Cited

U.S. PATENT DOCUMENTS

| | | | |
|---|---|---|---|
| 4,898,483 | 2/1990 | Iizuka | 400/61 |
| 4,962,475 | 10/1990 | Hernandez | 395/146 |
| 5,090,826 | 2/1992 | Morioka | 400/63 |
| 5,189,731 | 2/1993 | Sakamoto | 395/146 |

OTHER PUBLICATIONS

The Best Book of: Word Perfect Verison 5.0, p. 697.

Primary Examiner—David A. Wiecking
Assistant Examiner—Steven S. Kelley
Attorney, Agent, or Firm—Oliff & Berridge

[57] ABSTRACT

When a text name is selected on an index during editing other text data, the text data which is processed for editing is automatically stored in a text store area in a RAM. At this time, the text data corresponding to the newly selected text name is read out in the text store area and is displayed on the display.

17 Claims, 8 Drawing Sheets

FIG. 4B

| S314 | DISPLAY AN EDIT SCREEN |
|---|---|
| S315 | ANY KEY INPUT? |
| S316 | OPEN KEY INPUT? |
| S317 | STORE KEY INPUT? |
| S318 | EXECUTE PROCESS FOR EDITING |
| S319 | TXSZ CHANGED? |
| S320 | TXSZ←TXSZ+DIFFERENCE BETWEEN NON-EDITED TXSZ AND EDITED TXSZ |
| S337 | TXTPS OF EACH TEXT WHICH IS STORED BEHIND TEXT DATA WHICH IS PROCESSED FOR EDITING |
| S338 | SHIFT EACH TEXT DATA ACCORDING TO THE CHANGED TXTP |
| S339 | STORE TEXT DATA IN TEXT EDIT AREA INTO TEXT STORE AREA |
| S340 | KEY FOR EDITING INPUT? |

FIG. 5B

| S321 | READ OUT TEXT NAMES OF EACH TEXT |
|---|---|
| S322 | DISPLAY AN INDEX |
| S323 | ANY KEY INPUT? |
| S324 | CANCEL KEY INPUT? |
| S325 | CURSOR KEY INPUT? |
| S326 | MOVE BLOCK CURSOR ON TEXT NAMES |
| S327 | RETURN KEY INPUT? |
| S328 | STORE TEXT NAME INDICATED WITH BLOCK CURSOR |
| S336 | SOUND ERROR BUZZER |

FIG. 6B

| S329 | NEWTEXT? |
|---|---|
| S334 | INPUT TEXT NAME |
| S335 | STORE NEWTEXT IN CONTROL AREA |
| S330 | TXTPS OF EACH TEXT WHICH IS STORED BEHIND TEXT DATA WHICH IS PROCESSED FOR EDITING |
| S331 | SHIFT EACH TEXT DATA |
| S332 | STORE TEXT DATA IN TEXT EDIT AREA INTO TEXT STORE AREA |
| S333 | READ OUT TXTP AND TXSZ CORRESPONDING TO THE SELECT D TEXT NAME |

# WORD PROCESSING APPARATUS

BACKGROUND OF THE INVENTION

1. Field of the Invention

The present invention relates to a word processing apparatus capable of reading out text data during editing of other text data, and more particularly, to a word processing apparatus capable of automatically storing the text data which is processed for editing when the other text data is read out.

2. Description of the Related Art

Conventionally, a general word processor for English and for Japanese comprises a display for displaying text data in a plurality of lines and further comprises various functions for inputting and editing the text data.

According to the word processing apparatus, when an operator wants to store the text data which is processed for editing, the operator operates a menu open key, so that a menu is displayed. The operator selects a store operation for storing the text data from the menu. After this, the operator inputs the text name of the text data to be stored and operates a return key. Then, the text name and the text data corresponding to the text name are stored into an interior memory or a floppy disk installed in the word processing apparatus.

Moreover, when the operator wants to read out text data stored in the interior memory or the floppy disk onto the display, the operator operates the menu key, so that the menu is displayed. The operator selects a read out operation from the menu, the index for showing the text names of text data stored in the interior memory or the floppy disk is displayed on the display. The operator then selects the text name of the text data to be read out on the index and operates the return key. Then, the selected text name and the text data corresponding to the text name are read out from the interior memory or the floppy disk onto the display.

However, according to the word processing apparatus mentioned above, it is difficult to view stored data while editing other data, that is, when the operator wants to read out text data while the operator edits other text data. At this time, suppose that the operator wants to store the text data which is processed for editing. Then, the operator has to operate the key for storing the text data which is processed for editing into the interior memory or the floppy disk, and further, has to operate the key for reading out the other stored text data. Therefore, it is difficult for an operator to execute the above-mentioned operations. Moreover, it is possible that the operator will make an error in the store operation. So, there is the possibility that the edited text data will be deleted.

SUMMARY OF THE INVENTION

It is therefore an object of the present invention to provide a wordprocessing apparatus capable of automatically storing text data which is processed for editing without a specific store operation by an operator when the other text data is read out.

To achieve the above-mentioned and other objects, the word processing apparatus of the present invention comprises an input means for inputting a text data, a memory means for storing a plurality of text data inputted by the input means, a display means for displaying the information composed of characters and symbols, and a text display control means for reading out the text data stored in the memory means and controlling the display means such that the display means displays the information of the read text data, a select means for selecting a text data stored in the memory means, and a text control means for storing the text data which is being processed for editing when the reading means reads out the text data selected by the select means.

According to the word processing apparatus of the present invention having the above-mentioned structure, the text data inputted by the input means is stored in the memory means. The display means displays the information composed of characters and symbols, and the text display control means reads out the text data stored in the memory means and controls the display means such that the display means displays the information of the read text data. In response to the selection of specific text data from a plurality of text data by way of the select means, the text control means stores the text data which is processed for editing while the text display control means reads out the selected text data according to the selection by the select means.

As described above, the word processing apparatus of the present invention can automatically store the text data which is processed for editing by the way of the text control means when the other text data is read out. Therefore, it is very easy for an operator to operate the word processing apparatus. Further, it is simple for an operator to read out the next text data during editing of the present text data, thereby saving the operator's time and effort.

BRIEF DESCRIPTION OF THE DRAWINGS

FIG. 4B is a table listing the steps of the flowchart of FIG. 4A;

FIG. 5B is a table listing the steps of the flowchart of FIG. 5A;

FIG. 6B is a table listing the steps of the flowchart of FIG. 6A.

DETAILED DESCRIPTION OF PREFERRED EMBODIMENTS

Hereinafter, embodiments employing the present invention will be explained with reference to the figures.

Figure 1:
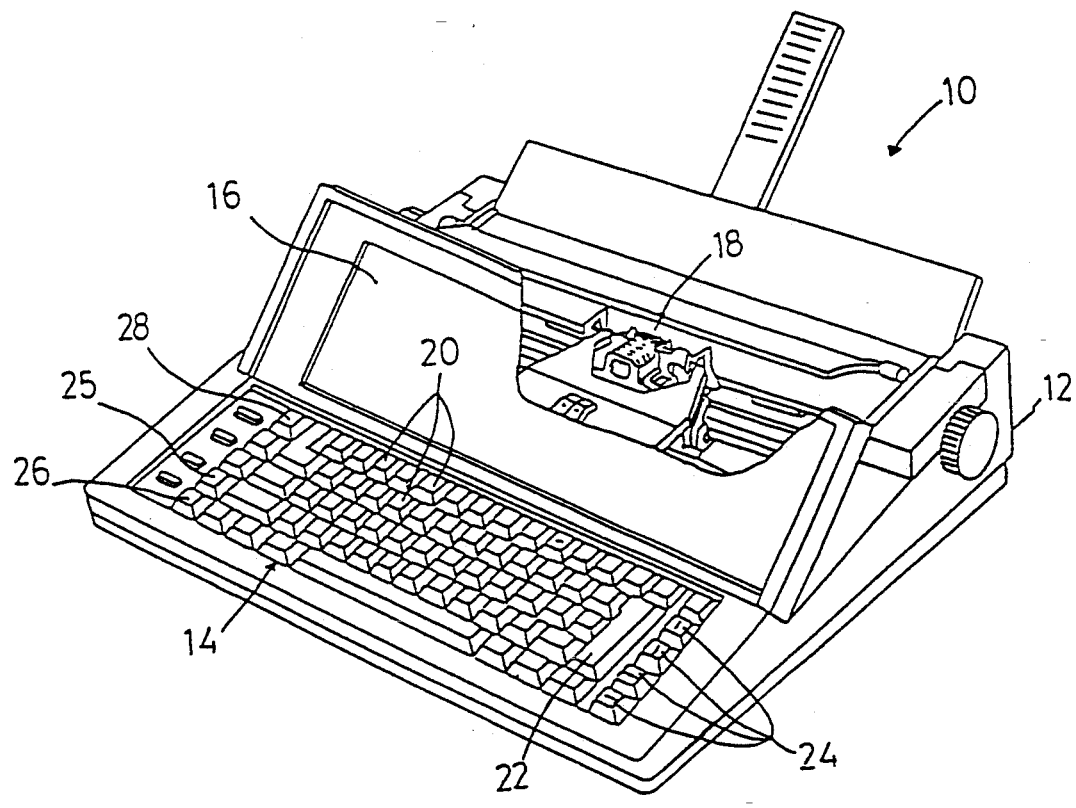
FIG. 1 is a perspective view of a word processor.

As shown in FIG. 1, a keyboard 14 is provided on the fore portion of a main frame 12 of a word processor 10. At the rear of the keyboard 14, a liquid crystal display 16, for displaying characters and symbols in up to twenty lines, is pivotably provided. When an operator operates the word processor 10, the liquid crystal display 16 is placed in an operation position shown in FIG. 1. When the operator does not operate the word processor 10, the liquid crystal display 16 is laid down backward and can be placed in a stored position. A print device 18 is provided at the rear of the main frame 12.

The keyboard 14 has character keys 20 such as alphabet keys, figures keys and symbol keys, a return key 22, cursor movement keys 24, a storing key 25 for storing a text data displayed on the display 16, an open key 26 for displaying an index, a cancel key 28 for ceasing executing various functions, and well-known various function keys.

Figure 2:
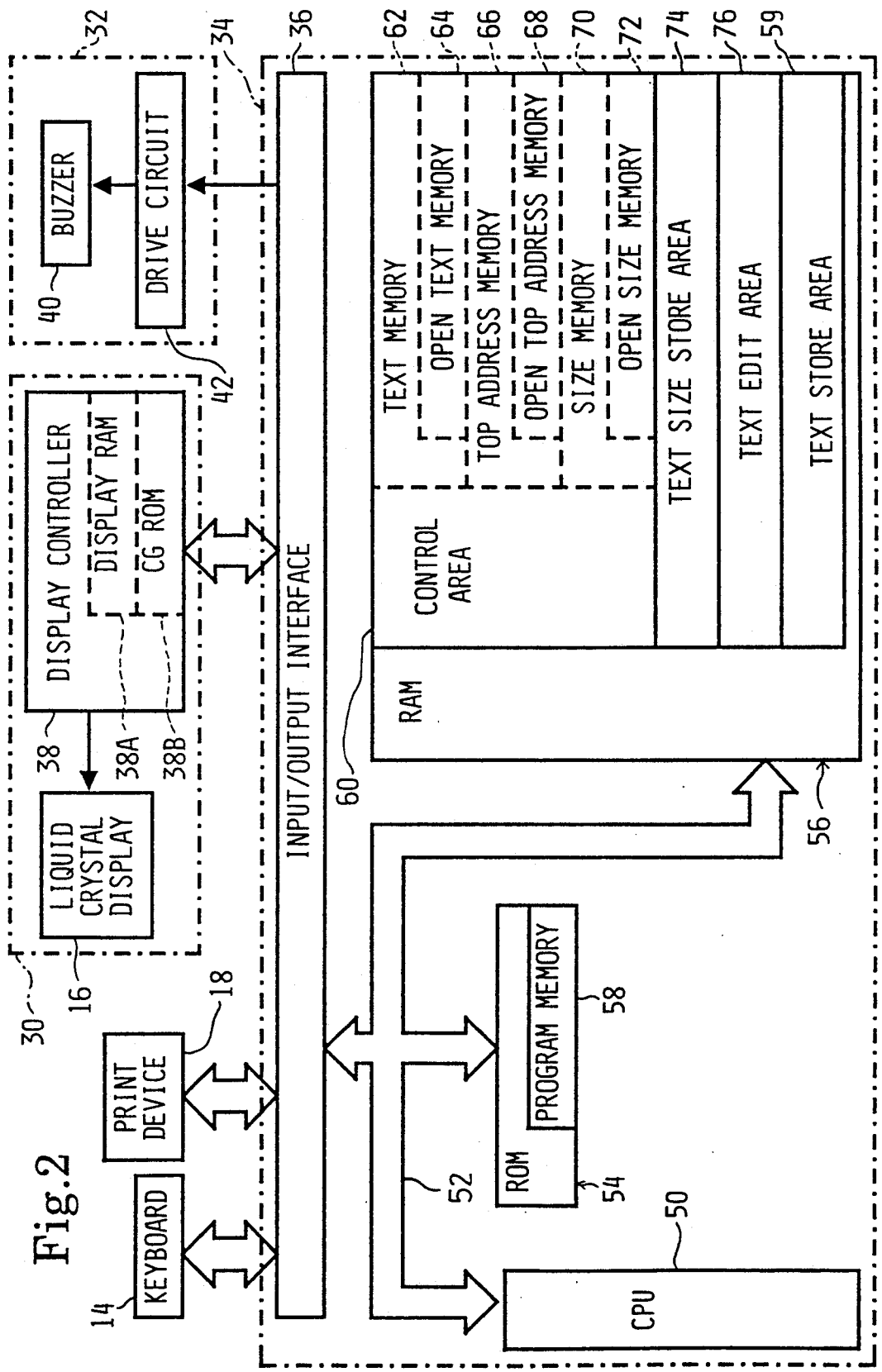
FIG. 2 is a block diagram of the control system of the word processor.
Figure 3:
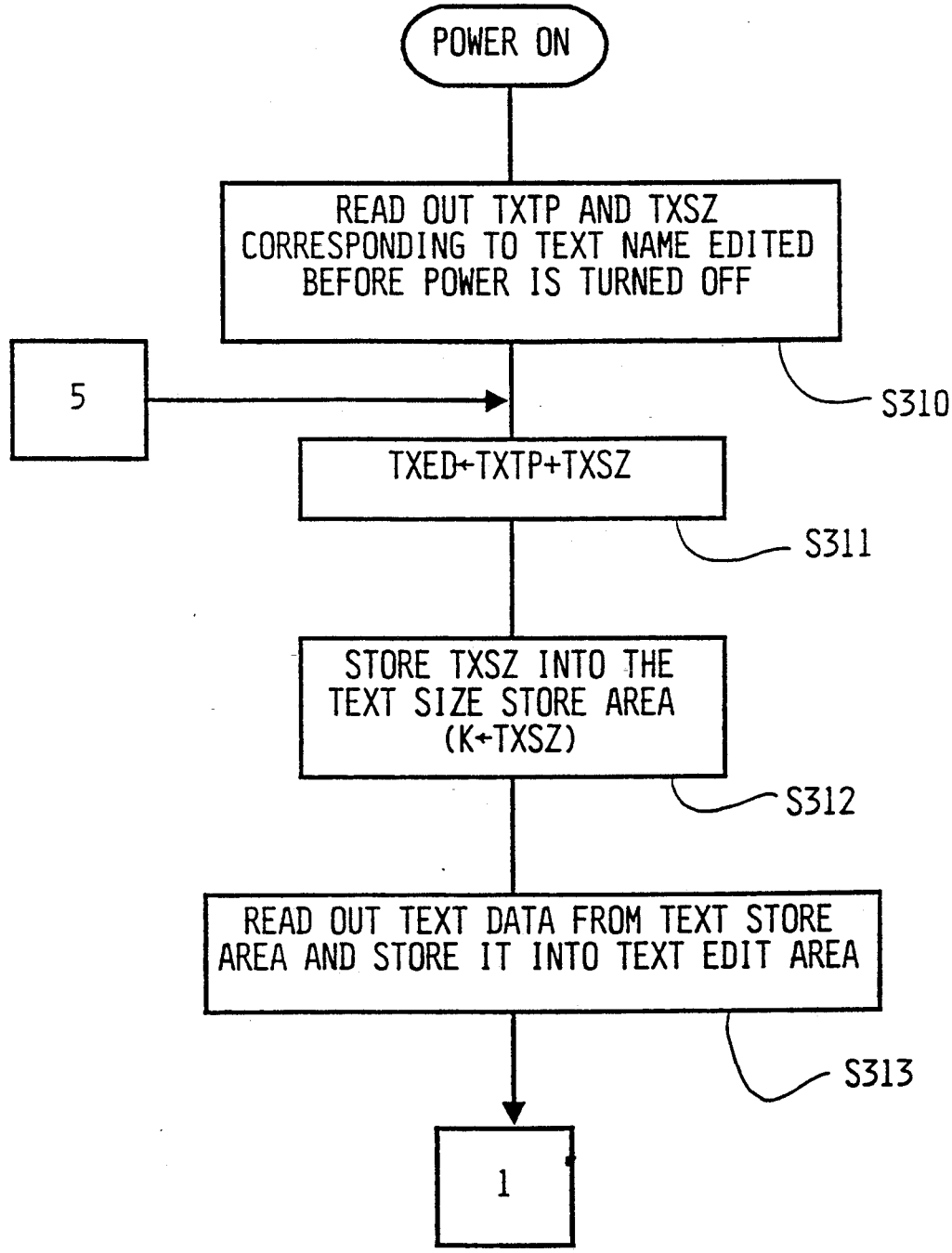
FIG. 3 is a flow chart showing an automatic closed process and open process for text.
Figure 4A:
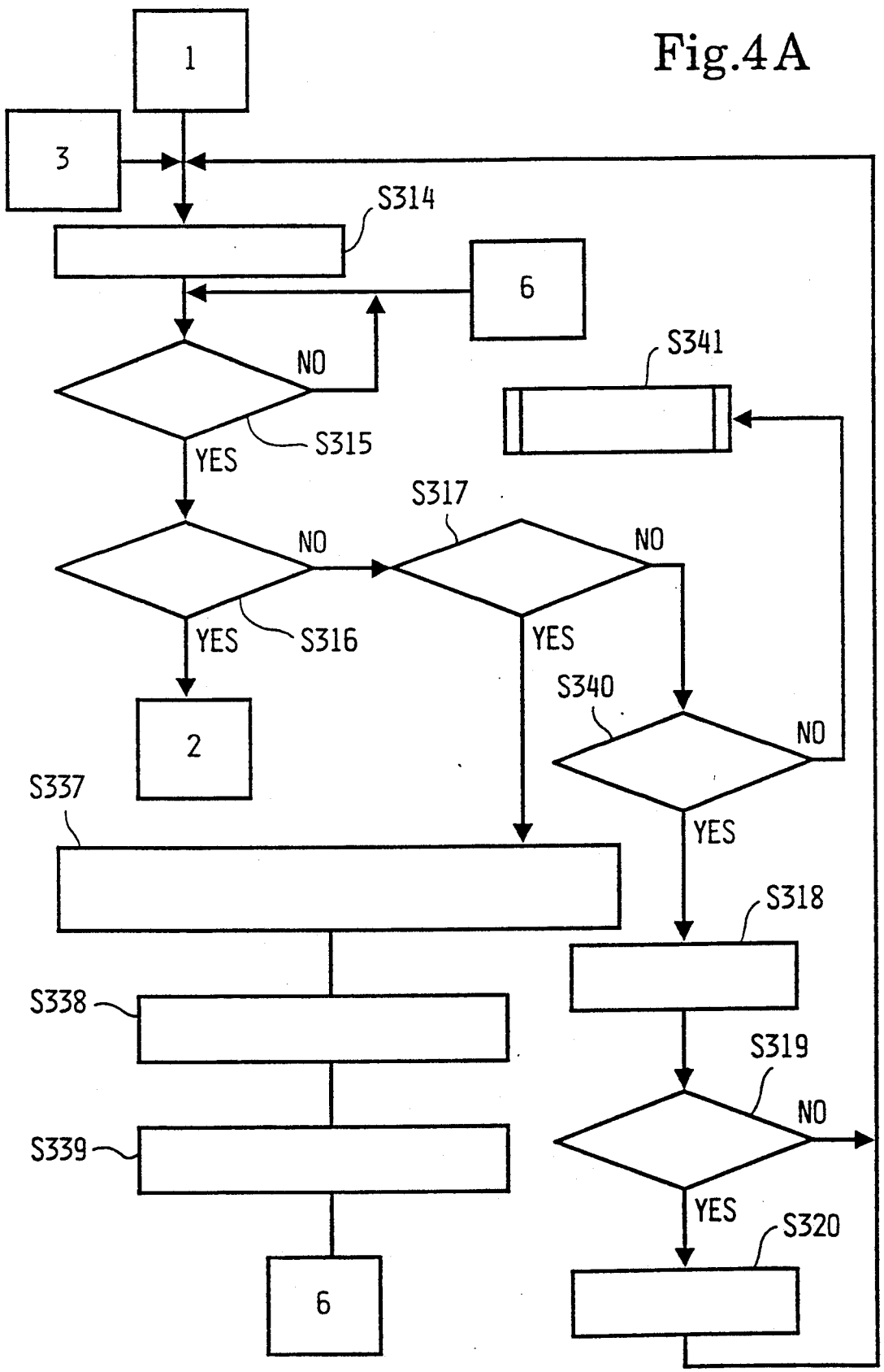
FIG. 4A is a flow chart showing an automatic closed process and open process for text.
Figure 5A:
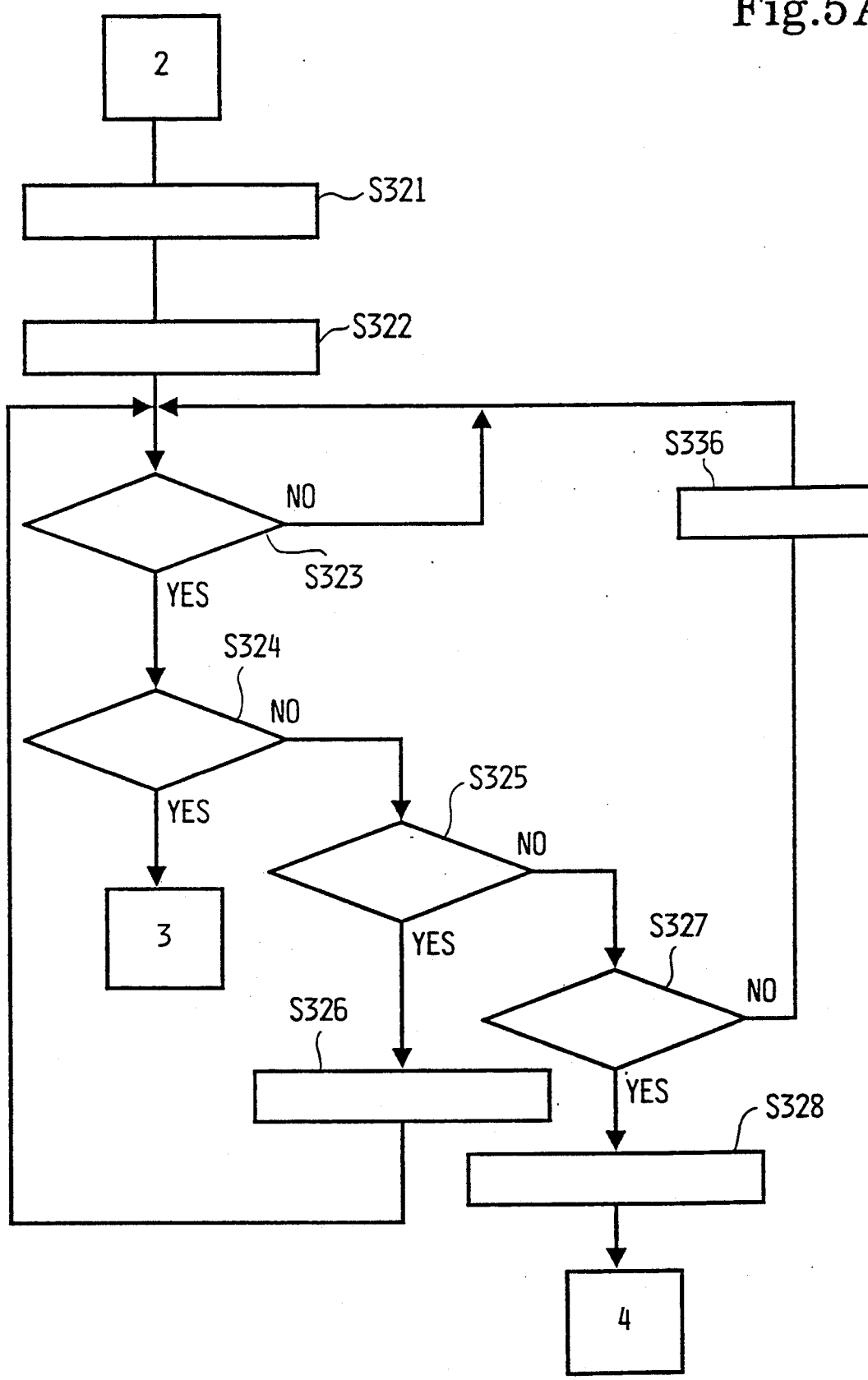
FIG. 5A is a flow chart showing the automatic closed process and open process for text continued from FIG. 4A.
Figure 6A:
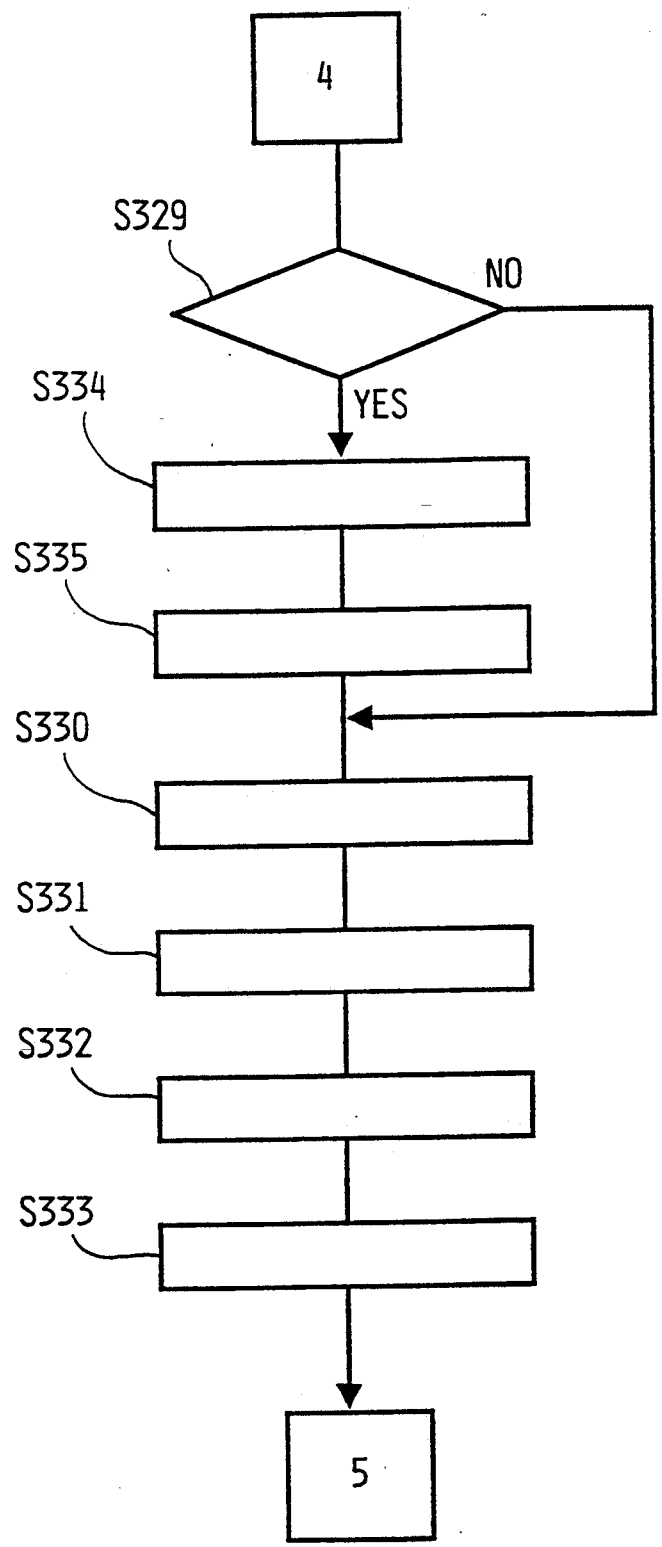
FIG. 6A is a flow chart showing the automatic closed process and open process for text continued from FIG. 5A.

Next, a control system for the word processor 10 is structured as shown in the block diagram of the FIG. 2.

The word processor 10 comprises generally a keyboard 14, the print device 18, a display device 30, an alarm device 32 and a controller 34. The key board 14, the print device 18, the display device 30 and the alarm device 32 are connected to an input/output interface 36 of the controller 34, respectively.

The control device 30 comprises the liquid crystal display 16 and a display controller 38 having a display RAM 38A and a character generator ROM 38B. The RAM 38A outputs display data onto the display 16. The ROM 38B stores a plurality of dot patterns for characters and symbols and so on, therein.

The alarm device 32 comprises a buzzer 40 and a drive circuit 42 which makes the buzzer 40 sound.

The controller 34 comprises a CPU 50, the input/output interface 36 connected to the CPU 50 through a bus 52 such as a data bus, a ROM 54 and a RAM 56 backed-up by a battery.

A program memory 58 of the ROM 54 stores the display program and the control program therein. The display program is for controlling the display device 30 according to the data inputted from the keyboard 14. The control program has a closed process for storing text data into a store area 59 of the RAM 56 and an open process for reading out the text data from the store area 59 of the RAM 56. The text data is processed for editing by the open process.

The RAM 56 has a control area 60 for storing particular information of the text data, a text size store area 74 for storing a value K of the text size corresponding to the text data prior to editing, a text edit area 76 for editing the text data, a text store area 59 for storing each text data, and various memories such as a work memory for temporarily storing the data calculated by the CPU 50.

Moreover, the control area 60 comprises a text memory 62 for storing text names corresponding to each text, a top address memory 66 for storing the top addresses corresponding to each text and a size memory 70 for storing the text sizes corresponding to each text.

Further, the text memory 62 has an open text memory 64 for storing the text name of which text data is currently processed for editing. The top address memory 66 has an open top address memory 68 for storing the text top address corresponding to the text of the open text memory 64. The size memory 70 has an open size memory 72 for storing the text size corresponding to the text of the open text memory 64.

Next, the control routine for executing the text closed and open processes which are controlled by the controller 34 of the word processor 10 will be explained with reference to FIGS. 3 through 6.

Suppose that the text data of four texts A, B, C and D are stored in sequence into the text store area 59 of the RAM 56. At this time, text names A, B, C and D, and a text name NEWTEXT are stored in the text memory 70. The text name, NEWTEXT, is a blank text including no data.

First, when the power supply is turned on, text which was processed for editing before the power supply was turned off is read out. For example, the text name of the text B stored in the open text memory 64, the text top address of the text B stored in the open top address memory 68 (hereinafter referred to as TXTP) and the text size of the text B stored in the open size memory 72 (hereinafter referred to as TXSZ) are read out, respectively (S310).

Next, the text end address of the text data of the text B (hereinafter referred to as TXED) is calculated based on the TXTP stored in the open top address memory 68 and the TXSZ stored in the open size memory 72 (S311). And, the TXSZ of the open size memory 72 is stored in the text size store area 74 (S312). Next, the text data from the TXTP to TXED calculated in step S311, that is, the text data of the text B, is read out from the text store area 59 into the text edit area 76 (S313) and is displayed on the display 16 (S314).

If any other key for editing besides the open key 26 and the store key 25 is operated (S315: YES, S316: NO, S317: NO, S340: YES) the edit process according to the key for editing is executed (S318). When the text data on the display 16 is edited by way of the character keys 20 and the cursor movement keys 24, the edited text data is stored into the text edit area 76.

When the TXSZ is changed owing to the above-mentioned edit process. (S319: YES), the TXSZ in the open size memory 72, which corresponds to the text data prior to editing, has added or subtracted thereto the change in size, and is again stored in the open size memory 72 (S320). After this, the CPU 50 returns S314 and displays the edited text data on the display 16.

On the other hand, when the data is overwritten or when a cursor is only moved, the TXSZ does not change. Therefore, the TXSZ stored in the open size memory 72 is not changed (S319: NO), the CPU 50 returns to S314 and displays the edited text data on the display 16.

When the open key 26 is operated during editing of the text B (S316: YES), the CPU 50 reads out text names of each text, A, B, C and D, and a NEWTEXT from the text memory 62 (S321) and displays an index for showing text names (S322).

To select a text to be read out on the index, the operator operates the cursor movement keys 24 (S323: YES, S324: NO, S325: YES). Then, since the block cursor on the index moves on the text names (S326), the operator can indicate the text name to be read out with the block cursor.

Suppose that the operator moves the block cursor on the text C. When the operator selects the text by operating the return key 22 (S327: YES), the text name indicated with the block cursor, for example, the text name of the text C, is stored in the work memory (S328).

If the stored text name is not a NEWTEXT, that is, the stored text name already exists in the RAM (S329: NO), the difference between the TXSZ stored in the open size memory 72 and the TXSZ stored in the text size store area (K) is calculated. The TXSZ of the open size memory 72 corresponds to the text data of the edited text B and the TXSZ of the text size store area 74 corresponds to the text data of the text B prior to editing. The difference of the TXSZs (K) is added onto or subtracted from each TXTP of the texts C and D stored in the top address memory 66. The texts C and D are stored behind the text B into the store area 59 (S330). The calculated TXTPs corresponding to the text data of the texts C and D are newly stored in the top address memory 66 (S330).

After this, each text which is stored behind the text corresponding to the TXTP in the open top address memory 68, that is, the text data of the texts C and D stored in the text store area 59, are shifted according to each changed TXTP (S331).

After the text data is shifted, the text data of the text B which is edited in the text edit area 76 is stored in the area which is secured from the TXTP of the text B to the TXED of the text B in the text store area 59 (S332) and the text closed process is completed.

As described above, the edited text data is automatically stored when the other text data is selected. Therefore, there is no possibility that the text data which is processed for editing will be deleted. Thus, it is very easy for an operator to read out the next text data during editing one text data.

The text name in the text memory 62 corresponding to the text C selected on the INDEX, the TXTP corresponding to the text C in the top address memory 66 and the TXSZ corresponding to the text C in the open size memory 72 are respectively read out to the open text memory 64, the open top address memory 68 and the open size memory 72 (S333). After this, the CPU 50 returns to step S311.

The CPU 50 calculates the TXED of the text C (S311), stores the TXSZ of the selected text C into the text size store area 74 (S312) and reads out the text data of the text C into the text edit area 76 (S313). Then, the text data of the text C is displayed on the display (S314) and the keys are ready for an input operation (S315).

On the other hand, when the CPU 50 determines that the selected text name is a NEWTEXT in step S329, that is, when a NEWTEXT is composed (S329: YES), the operator names the text with the character keys 20 (S334). The text name is stored in the text memory 62 and further, the TXTP and TXSZ corresponding to the named text data are newly stored in the top address memory 66 and the size memory 70, respectively (S335).

According to the TXSZ of the text data corresponding to the edited text B, the text data of the texts C and D are shifted in the text store area 59 (S330, S331). Thus, the text data of the text B which is edited in the text edit area 76 is stored in the area secured in the text store area 59 (S332).

Next, the CPU 50 reads out the text name corresponding to the NEWTEXT selected on the INDEX, the TXTP corresponding to the NEWTEXT and the TXSZ corresponding to the NEWTEXT, from the control area 60 (S333), and returns to step S311. The CPU 50 calculates the TXED of the NEWTEXT (S311) and stores the TXSZ into the text size store area 74 (S312), and reads out the text data of the NEWTEXT from the text store area 59 into the text edit area 76 (S313). And the text data corresponding to the NEWTEXT is displayed on the display 16 (S314). However, in this case, the display 16 displays a blank text data until any key is operated.

Thus, a NEWTEXT is given the text name when the text is newly composed. Therefore, there is no need to name the NEWTEXT being edited when the next text is read out. Therefore, it is very easy to read out the next text.

Moreover, when the cancel key 28 on the INDEX is operated in step S324 (S324: YES), the CPU 50 returns to step S314, and the text data being edited is again displayed until then (S314).

Further, if any other key than the cancel key 28, the cursor movement keys 24 and the return key 22 is operated (S324: NO, S325: NO, S327: NO), an error buzzer sounds (S336). Then, the CPU 50 returns to S323 still displaying the INDEX, and the keys are ready for the input operation.

Moreover, when the storing key 25 is operated in step S315 (S317: YES), the CPU 50 executes operations in S337, S338 and S339, which are almost the same as that in S330, S331 and S332 for the closed process. The edited text data is stored in the store area 59. After this, the CPU 50 returns to S315, and the keys are ready for the input operation.

Further, if any other key than the key for editing is operated (S340: NO), the process is executed according to the operated key (S341). For example, when the menu open key is operated, a menu is displayed on the display 16.

In the above-mentioned embodiment, the text data is edited on the text edit area 76 provided in the RAM 56. However, it is possible to edit the text data directly in the text store area 59 without the text edit area 76. Moreover, the text store area 59 may be provided on a floppy disk without the text store area 59 on the RAM 56 in order to edit the text data.

While advantageous embodiments have been chosen to illustrate the invention, it will be understood by those skilled in the art that various changes and modifications can be made therein without departing from the scope of the invention as defined in the appended claims.

What is claimed is:

1. A word processing apparatus comprising:
   input means for inputting data;
   retentive memory means for retentively storing in a non-volatile memory the input data in a plurality of named text data sets;
   display means for selectively displaying data of one of said plurality of named text data sets;
   selecting means for selecting a named text data set from said memory means to be displayed on said display means; and
   control means responsive to said selecting means for substantially simultaneously automatically storing in said retentive memory means said displayed named text data set, a first named text data set, and reading out from said retentive memory means and displaying said selected named text data set, a second named text data set, on said display means.

2. The word processing apparatus of claim 1, wherein said memory means stores text data, text name data, address memory data and text size data for each named text data set in said retentive memory means.

3. The word processing apparatus of claim 2, further comprising comparing means for comparing stored text size data for said first named text data set with displayed text size data and adjusting the stored text data of following named text data sets with respect to displayed text data.

4. The word processing apparatus of claim 2, wherein said memory means stores address memory data for the first named text data set.

5. The word processing apparatus of claim 2, wherein said selecting means selects a text name from the stored text name data containing names for each of said plurality of named text data sets.

6. The word processing apparatus of claim 5, further comprising instruction means for instructing said control means to read out the named text data set from said retentive memory means corresponding to the selected text name data.

7. The word processing apparatus of claim 1, further comprising instruction means for instructing said control means to read out data corresponding to the selected named text data set.

8. The word processing apparatus of claim 1, wherein said control means includes means for automatically naming the automatically stored first named text data set.

9. The word processing apparatus of claim 1, further comprising comparing means for comparing stored data with displayed data and adjusting the stored data with respect to the displayed data.

10. The word processing apparatus of claim 1, further comprising warning means for warning an operator of improper input.

11. A method of operating a word processing apparatus, comprising the steps of:
inputting at least first and second named text data sets;
storing the input named text data sets in a retentive memory that is a non-volatile memory;
selectively displaying the first named text data set;
selecting the second named text data set to be displayed; and
automatically retentively storing the first named text data set in said retentive memory while substantially simultaneously reading out from said retentive memory and displaying the second named text data set in response to selecting the second named text data set.

12. The method of claim 11, further comprising the steps of:
inputting a third named text data set;
storing the input third named text data set in said retentive memory;
selectively displaying the first named text data set;
selecting the third named text data set to be displayed; and
automatically retentively storing the first named text data set in said retentive memory and reading out from said retentive memory and displaying the third named text data set.

13. The method of claim 11, further comprising the step of comparing stored text data with displayed named text data set and adjusting the stored text data of following stored named text data sets in said retentive memory with respect to the displayed named text data set.

14. The method of claim 11, wherein the step of storing the data includes storing address memory data for the first named text data set.

15. The method of claim 11, wherein the step of selecting the second stored named text data set includes selecting a text name from the stored named text data sets.

16. The method of claim 11, further comprising the step of automatically naming the automatically stored first named text data set.

17. The method of claim 11, further comprising the step of warning an operator of improper input.

* * * * *